(12) United States Patent
Jang et al.

(10) Patent No.: US 12,261,328 B2
(45) Date of Patent: Mar. 25, 2025

(54) BATTERY MODULE AND BATTERY PACK COMPRISING SAME

(71) Applicant: LG ENERGY SOLUTION, LTD., Seoul (KR)

(72) Inventors: Sung Hwan Jang, Daejeon (KR); Jun Yeob Seong, Daejeon (KR); Hyoung Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/279,198

(22) PCT Filed: Oct. 13, 2022

(86) PCT No.: PCT/KR2022/015522
§ 371 (c)(1),
(2) Date: Aug. 28, 2023

(87) PCT Pub. No.: WO2023/075229
PCT Pub. Date: May 4, 2023

(65) Prior Publication Data
US 2024/0154273 A1    May 9, 2024

(30) Foreign Application Priority Data
Oct. 26, 2021  (KR) ........................ 10-2021-0143922

(51) Int. Cl.
*H01M 50/569*  (2021.01)
*H01M 50/211*  (2021.01)
(Continued)

(52) U.S. Cl.
CPC ....... *H01M 50/569* (2021.01); *H01M 50/211* (2021.01); *H01M 50/367* (2021.01); *H01M 50/505* (2021.01); *H01M 50/516* (2021.01)

(58) Field of Classification Search
CPC ............ H01M 50/569; H01M 50/516; H01M 50/211; H01M 50/505; H01M 50/367
See application file for complete search history.

(56) References Cited

U.S. PATENT DOCUMENTS

| | | |
|---|---|---|
| 2012/0189887 A1 | 7/2012 | Hohenthanner et al. |
| 2017/0025661 A1 | 1/2017 | Gibeau et al. |
| 2018/0048033 A1* | 2/2018 | Lee ........................ H01M 50/50 |

FOREIGN PATENT DOCUMENTS

| | | |
|---|---|---|
| EP | 3739662 A2 | 11/2020 |
| EP | 3739662 A3 | 12/2020 |

(Continued)

*Primary Examiner* — Jane J Rhee
(74) *Attorney, Agent, or Firm* — Bryan Cave Leighton Paisner LLP (57) ABSTRACT

The battery module according to the present disclosure includes: a battery cell assembly in which two or more longitudinal unit cells, each of which is composed of two or more battery cells having leads provided at both ends in the longitudinal direction and arranged in a row in the longitudinal direction, are stacked in a thickness direction of the battery cell; a module case in which the battery cell assembly is accommodated; a sensing line electrically connected to the electrode lead of a battery cell included in the battery cell assembly, and having one end exposed to an outside of the module case; and a sensing plate that is coupled to one end of the sensing line exposed to the outside.

11 Claims, 8 Drawing Sheets

(51) Int. Cl.
   *H01M 50/367*  (2021.01)
   *H01M 50/505*  (2021.01)
   *H01M 50/516*  (2021.01)

(56) References Cited

FOREIGN PATENT DOCUMENTS

| | | | |
|---|---|---|---|
| JP | 2011049080 | A | 3/2011 |
| JP | 2011-96507 | A | 5/2011 |
| JP | 2017084465 | A | 5/2017 |
| JP | 2018513528 | A | 5/2018 |
| JP | 2020-514976 | A | 5/2020 |
| JP | 2020528642 | A | 9/2020 |
| KR | 10-2015-00059515 | A | 6/2015 |
| KR | 10-2015-0062777 | A | 6/2015 |
| KR | 10-2016-0127561 | A | 11/2016 |
| KR | 10-2016-0149836 | A | 12/2016 |
| KR | 10-1800398 | B1 | 11/2017 |
| KR | 10-2018-0060822 | A | 6/2018 |
| KR | 10-2009443 | B1 | 8/2019 |
| KR | 10-2020-0029307 | A | 3/2020 |
| KR | 10-2140311 | B1 | 7/2020 |
| KR | 10-2021-0042658 | A | 4/2021 |
| KR | 10-2021-0051723 | A | 5/2021 |
| KR | 10-2021-0080096 | A | 6/2021 |
| KR | 10-2259416 | B1 | 6/2021 |

\* cited by examiner

BATTERY MODULE AND BATTERY PACK COMPRISING SAME

CROSS-REFERENCE TO RELATED APPLICATIONS

This application is a National Phase entry pursuant to 35 U.S.C. § 371 of International Application No. PCT/KR2022/015522, filed on Oct. 13, 2022, and claims the benefit of and priority to Korean Patent Application No. 10-2021-0143922, filed on Oct. 26, 2021, the disclosures of which are incorporated by reference in their entirety for all purposes as if fully set forth herein.

TECHNICAL FIELD

The present disclosure relates to a battery module. More specifically, with respect to a battery module configured with expandability, it relates to the battery module that is capable of easier sensing of electrical properties between battery modules. In addition, the present disclosure relates to a battery pack including the battery module.

BACKGROUND

Recently, secondary batteries capable of charging and discharging have been widely used as energy sources of wireless mobile devices. Further, secondary batteries have been drawing attention as energy sources of electric vehicles, hybrid electric vehicles, and the like proposed as solutions to solve air pollution of existing gasoline vehicles using fossil fuels, diesel vehicles that use fossil fuels, and the like. Accordingly, kinds of applications using secondary batteries have diversified in many directions because of the advantages of secondary batteries, and in the future, secondary batteries are expected to be applied to even more fields and products.

In addition, as a power source of Electric Storage System (ESS) and electric vehicles, etc., the demand for the battery module that internally accommodates a plurality of secondary batteries that are electrically connected in series/parallel and the demand for the battery pack that is composed of such battery modules have been increasing.

Such battery module or battery pack has an outer housing made of a metal material in order to protect a plurality of secondary batteries from external shock or to store a plurality of secondary batteries.

Figure 1:
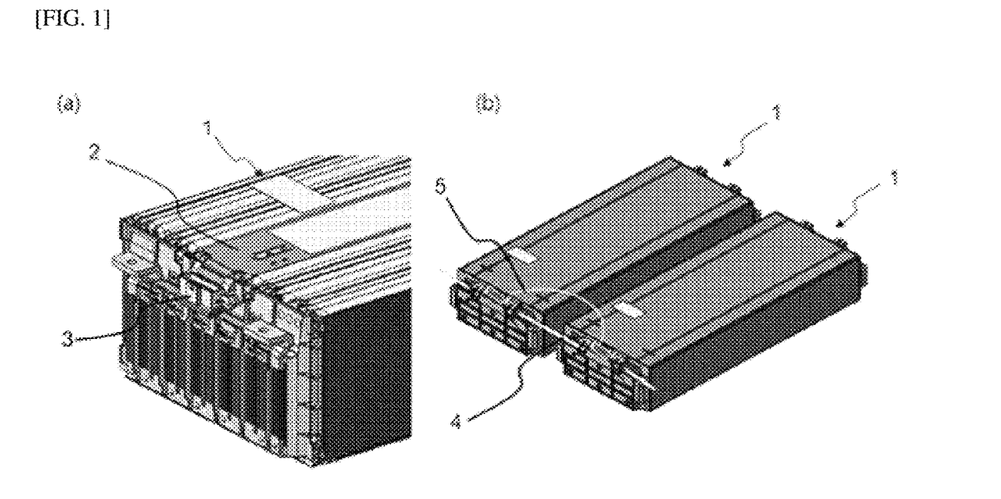

(a) of FIG. 1 is a partial perspective view of a typical conventional battery module 1, and (b) of FIG. 1 is illustrating the connection structure of battery modules for the sensing between the conventional modules. Such conventional battery modules have the following problems.

First, because a single battery cell is layered only in that thickness direction, the space utilization of the battery cell arrangement is low and degree of freedom in designing is low, so there has been limits to configuring a battery pack by bundling modules with such formation. That is, it was not easy to configure a battery module or a battery pack that can fit into restricted space such as an automobile or various type of spaces. In addition, because a single module is layered with dozens of battery cells, when a single battery cell gets ignited, flames can be easily propagated to other battery cells, so there is a risk that the module burns out in a short time.

Second, illustrated as in (a) of FIG. 1, because it has a structure where a sensing line 2 gets connected to a connector 3 and the connector 3 gets connected to an external matching connector in order to sense electrical characteristics of the battery module, it has been necessary to install the connector with a complicated structure for each module. In addition, an external connector that has a male and female coupling structure with the connector installed in the module was separately needed. Because such connector with a male and female coupling structure has a complex shape, a terminal coupling structure (a male and female connector structure) for sensing electric characteristics of a battery module became complicated. Moreover, a connector with a complicated structure is difficult to mold, causing an increase in manufacturing cost.

Third, as illustrated in (b) of FIG. 1, for a sensing between banks of adjacent battery modules 1, an operation to connect between the modules with a busbar 4 and a harness 5 that connects a sensing connector were needed. Therefore, for a sensing between conventional modules, operation of connecting modules in a complicated assembling structure and fixing the member with laser welding, etc. were needed.

Accordingly, development of a battery module related technology is desired in which not only increase the degree of freedom in designing the battery module and the battery pack, but also facilitate sensing of each unit module as well as sensing between the modules with a simple structure.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

The present disclosure was made to solve above-mentioned problems, and the present disclosure is directed to provide an expandable battery module that connects battery cells in the longitudinal direction as well as in the thickness direction to improve space utilization of the battery module and the battery pack.

In addition, in terms of the expandable module, it is directed to provide a battery module with a structure that is capable of direct sensing of the module by omitting a conventional connector which has a complicated male and female coupling structure.

Furthermore, the present disclosure is directed to provide a battery pack with a structure that is capable of simple direct sensing without any complicated assembling structure when a plurality of battery modules is being sensed.

Technical Solution

The battery module according to the present disclosure to solve the above-mentioned problem includes: a battery cell assembly including two or more longitudinal unit cells stacked in a thickness direction of the battery cell, wherein each of the two or more longitudinal unit cells comprises two or more battery cells having electrode leads provided at both ends thereof in a longitudinal direction and arranged in a row in the longitudinal direction; a module case accommodating the battery cell assembly; a sensing line electrically connected to the electrode leads of the two or more battery cells included in the battery cell assembly and having a first end exposed to an outside of the module case; and a sensing plate coupled to the first end of the sensing line. In one example, wherein the sensing plate may have a coupling portion coupled to the first end of the sensing line, and a plate portion connected to an external terminal.

Specifically, wherein the plate portion may have an area greater than an area of the coupling portion.

In one example, wherein: the sensing plate may be disposed parallel to a side surface of the module case, in which the first end of the sensing line is exposed, an exposed surface of the first end of the sensing line may be positioned at the same height as the side surface of the module case, and the sensing plate contacts to the side surface of the module case while the sensing plate is coupled to the exposed surface of the first end of the sensing line.

In addition, wherein the module case may have an opening portion in a position corresponding to the first end of the sensing line, and the sensing line may be externally exposed through the opening portion.

In one example, wherein the first end of the sensing line may be bent to form a coupling plate parallel to the sensing plate.

In one example, wherein: the sensing line may be connected to a terminal busbar coupled to at least one of the electrode leads of the battery cell included in the battery cell assembly, and the sensing line may be electrically connected to the battery cell of the battery cell assembly through the terminal busbar.

Specifically, a second end of the sensing line opposite to the first end may be welded to the terminal busbar.

Alternatively, the second end of the sensing line and the terminal busbar may be coupled by the same type sensing plate as the sensing plate coupled to the first end of the sensing line.

As a specific example, the terminal busbar may be positioned between the electrode leads of the battery cell facing in the longitudinal direction of the longitudinal direction unit cell, and the electrode leads of the battery cell facing in the longitudinal direction may be coupled to the terminal busbar.

More specifically, the terminal busbar may comprise a first terminal busbar coupled to one electrode lead or electrode leads among the electrode leads of the battery cell facing each other in the longitudinal direction and a second terminal busbar that is coupled to the other electrode lead or electrode leads, the sensing line of the battery module may comprise a first sensing line coupled to the first terminal busbar and a second sensing line coupled to the second terminal busbar, and the sensing plate of the battery module may comprise a first and second sensing plates that are each coupled to the first and second sensing line, respectively.

In one example, a venting plate, extending in the longitudinal direction of the battery cell and having a venting channel therein, may be installed between rows of the same number of longitudinal direction unit cells on both sides based on the longitudinal direction of the battery cell, and the terminal busbar and the sensing line may be supported by the venting plate.

The battery pack as another aspect of the present disclosure may include a plurality of the above-mentioned battery modules. In addition, the plurality of the battery modules of the battery pack may be stacked in plurality in the thickness direction of the battery cell.

Advantageous Effects

According to the present disclosure, an expandable battery module that connects battery cells in the longitudinal direction as well as in the thickness direction to improve space utilization of the battery module and the battery pack can be obtained.

In addition, the present disclosure can realize a direct sensing structure that is suitable for such an expandable battery module.

Moreover, the present disclosure can provide a battery pack with a structure that is capable of simple direct sensing without any complicated assembling structure when a plurality of battery modules is being sensed.

BRIEF DESCRIPTION OF THE DRAWINGS (a) of FIG. 1 is a partial perspective view of a typical conventional battery module 1, and (b) of FIG. 1 illustrates the connection structure of battery modules for the sensing between the conventional modules.

REFERENCE NUMERALS

10: BATTERY CELL
11,12: LEAD
100: BATTERY CELL ASSEMBLY
110: LONGITUDINAL DIRECTION UNIT CELL
200: MODULE CASE
210: C-SHAPED WALL
220: I-SHAPED WALL
211: OPENING PORTION
230: FRONT END PLATE
240: REAR END PLATE
300: VENTING PLATE
310: MAIN PORTION
311: GAS VENTING CHANNEL
312: VENTING THROUGH HOLE
313: LEAD BONDING THROUGH HOLE
320: HEAT TRANSFER PROTECTION PLATE
400, 400': SENSING LINE (FIRST SENSING LINE, SECOND SENSING LINE)
410: ONE END OF THE SENSING LINE 500, 500': TERMINAL BUSBAR (FIRST TERMINAL BUSBAR, SECOND TERMINAL BUSBAR)
510, 510': TERMINAL BUSBAR SUPPORTING BLOCK
600, 600': SENSING PLATE
610, 610': COUPLING PORTION
620, 620': PLATE PORTION
1000: BATTERY MODULE

DETAILED DESCRIPTION

Hereinafter, the present disclosure may have various modifications and various examples, thus specific examples are illustrated in the drawings and described in detail in the detailed description. However, it should be understood that the present disclosure is not limited to specific embodiments, and includes all modifications, equivalents or alternatives within the spirit and technical scope of the present disclosure.

The terms that the present disclosure use are only used to explain a specific example and is not intended to limit the present disclosure. A singular expression includes a plural expression unless the context indicates otherwise. The terms "comprise," "include" and "have" used herein designate the presence of characteristics, numbers, steps, actions, components or elements described in the specification or a combination thereof, and it should be understood that the possibility of the presence or addition of one or more other characteristics, numbers, steps, actions, components, elements or a combination thereof is not excluded in advance.

Further, when a portion such as a layer, a film, an area, a plate, or the like is referred to as being "on" another portion, this includes not only the case in which the portion is "directly on" the another portion but also the case in which still another portion is interposed therebetween. In contrast, when a portion such as a layer, a film, an area, a plate, or the like is referred to as being "below" another portion, this includes not only the case in which the portion is "directly below" the another portion but also the case in which still another portion is interposed therebetween. In addition, to be disposed "on" in the specification of the present disclosure may include the case disposed at the lower portion as well as the upper portion.

A battery module according to the present disclosure includes: a battery cell assembly in which two or more longitudinal unit cells, each of which is composed of two or more battery cells having leads provided at both ends in the longitudinal direction and arranged in a row in the longitudinal direction, are stacked in a thickness direction of the battery cell; a module case in which the battery cell assembly is accommodated; a sensing line electrically connected to the electrode lead of a battery cell included in the battery cell assembly, and having one end exposed to an outside of the module case; and a sensing plate that is coupled to one end of the sensing line exposed to the outside.

Figure 2:
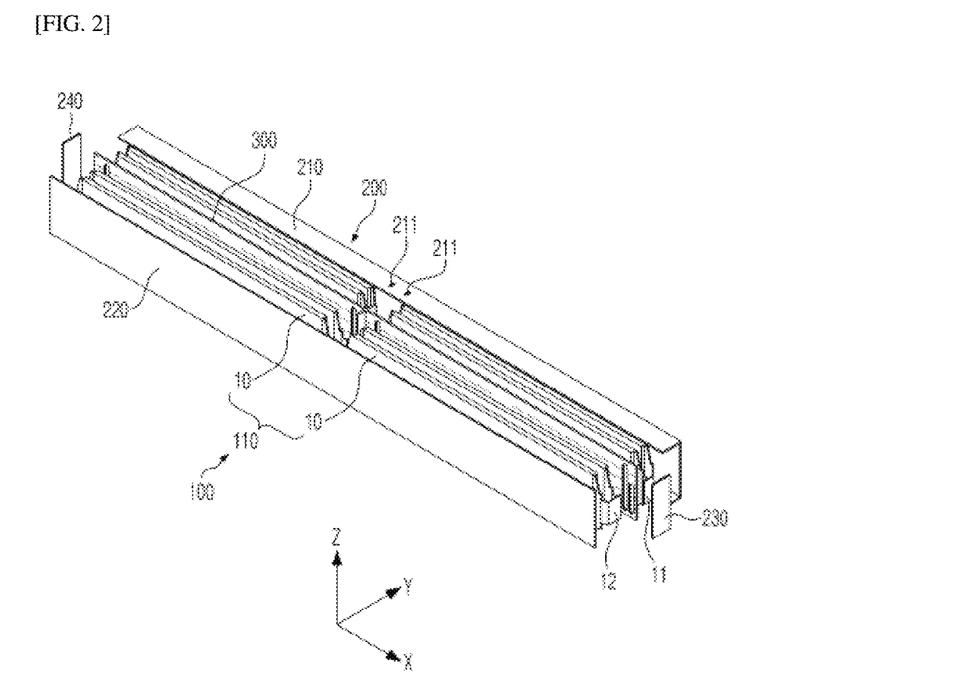
FIG. 2 is an exploded perspective view of a battery module of the present disclosure.
Figure 3:
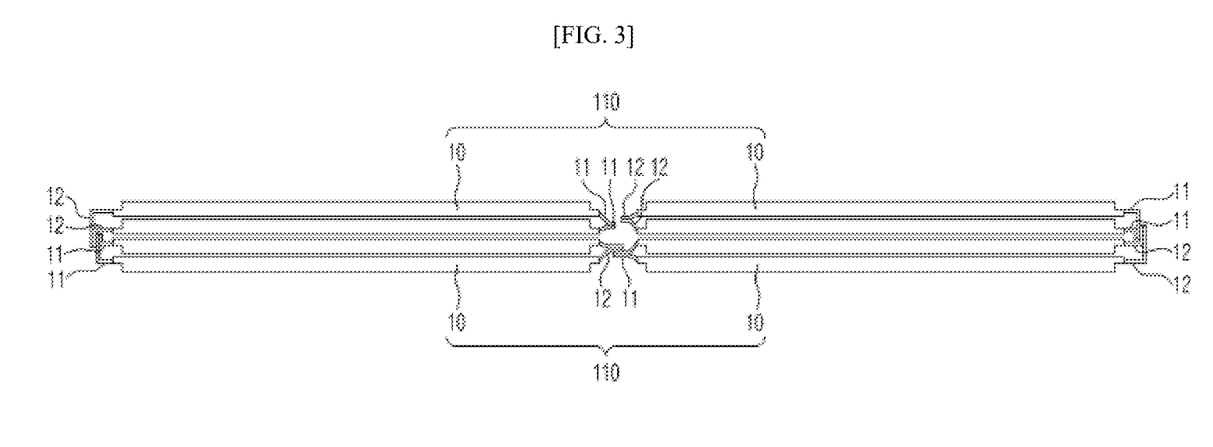
FIG. 3 is a plan view illustrating an electric connection structure of a battery cell assembly that is included in the battery module of FIG. 2.
Figure 4:
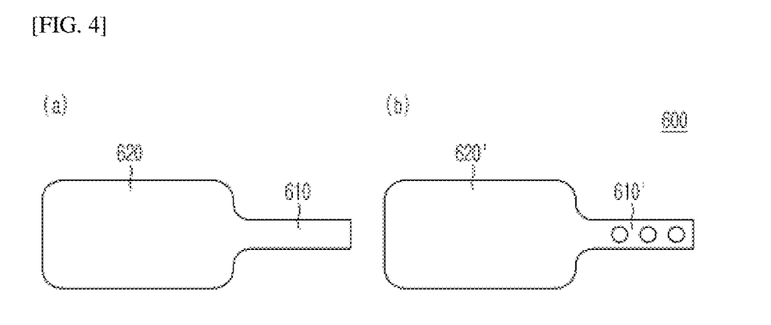
FIG. 4 is a schematic diagram representing an example of a sensing plate according to the present disclosure.

FIG. 2 is an exploded perspective view of the battery module of the present disclosure, FIG. 3 is a plan view illustrating an electric connection structure of a battery cell assembly that is included in the battery module of FIG. 2, and FIG. 4 is a schematic diagram illustrating a structure of a venting plate included in the battery module of FIG. 2.

For the convenience of illustration in FIG. 2, the illustration of the sensing line inside the battery module, and the sensing plate coupled to the sensing line were omitted and only the remaining parts were disassembled to be illustrated.

As illustrated in FIG. 2, the present disclosure includes a battery cell assembly 100 that comprises a longitudinal direction unit cell 110 and a module case 200 that accommodates the battery cell assembly 100. In FIG. 2, leads 11,12 are provided on both ends, and based on the conventional pouch-type battery cell 10 that is extended in longitudinal direction, X-direction represents the longitudinal direction of a battery cell 10 or a module (case), Y-direction represents the thickness direction (stacking direction of the battery cell) of the battery cell 10 or the module case 200, and Z-direction represents the vertical direction.

The battery cell 10 of the present disclosure is intended for a battery cell (so called two-way battery cell/pouch cell) having electrode leads provided at both ends in the longitudinal direction. According to this configuration, because a cathode lead 11 and an anode lead 12 are each provided by being protruded from both ends of the single battery cell 10, there is no interference between the leads, thereby increasing the area of the electrode lead, and the coupling process between the electrode lead and a busbar can be performed more easily.

The battery assembly 100 of the present disclosure includes a bundle of battery cells, in which two or more two-way battery cells are arranged in a row in the longitudinal direction and electrode leads of the battery cells facing each other in the longitudinal direction are electrically connected to each other, as the longitudinal direction unit cell 110. In FIG. 2, while two battery cells are connected in the longitudinal direction to form a longitudinal direction unit cell 110, two or more battery cells can be connected in the longitudinal direction. As long as the battery pack space where the battery module case 200 or the battery module 1000 is installed is permitted, the number of battery cells 10 connected in the longitudinal direction is not limited in principle. However, because there is a limit to the space of the battery module 1000 or the battery pack that can be practically installed in a vehicle or the like, it is desirable to connect approximately 2 to 4 battery cells in the longitudinal direction. In addition, based on the size (length) of the battery cell 10 being connected, the number of the battery cells 10 connected in longitudinal direction may vary. As described above, in the present specification, an assembly of battery cells 10 provided by having two or more battery cells 10 that have leads 11,12 provided at both ends in the longitudinal direction arranged in a row and electrically connecting the leads 11,12 of the battery cell ends facing each other is referred to as a longitudinal direction unit cell 110.

The battery cell assembly 100 included in the battery module 1000 of the present disclosure is formed by stacking two or more rows of the longitudinal direction unit cells 100 in the thickness direction (Y-direction) of the battery cell. The number of rows in which the longitudinal direction unit cells 110 are stacked also depends on the space allowed in the battery module 1000 and the battery pack, the size of the battery cell 10, etc. In addition, the number of battery cells 10 in the longitudinal direction and the number of rows can be decided by considering the capacity required by the electric device. As such, because the present disclosure can adjust the number of cells in the longitudinal direction and the number of rows of the battery cells of the battery cell assembly 100 accommodated in the module case 200, the degree of freedom in design is improved. In addition, instead of stacking dozens of battery cell assembly 100 as in the prior art, the battery cell assembly 100 can be more compactly formed if, for example, 2 to 4 battery cells are layered in the longitudinal direction and 2 to 6 rows are layered in the thickness direction. In addition, if such battery cell assembly 100 that is constructed with such a small number of battery cells 10 is accommodated in a separate module case 200, and if the battery module 1000 including such module case 200 is stacked like LEGO blocks in the longitudinal or in the thickness direction, a battery pack can be more freely configured by considering the space where the battery module 1000 or the battery pack is installed. For example, if the battery module 1000 is layered in the longitudinal direction, the same effect can be achieved even if the battery cells of the longitudinal direction unit cells 110 are not connected longer in the longitudinal direction. Therefore, each battery module (unit module) can be configured more compactly. Moreover, the degree of freedom in designing can be improved by stacking the required number of battery modules 1000 in the battery cell thickness direction. As in FIG. 1, it is hard to configure a battery pack as desired with a structure where dozens of battery cells are stacked in a single module case. That is, because the minimum unit of the battery cells included in the battery module constituting the battery pack are different, the conventional battery module 1 has a low degree of freedom in design.

In addition, in the case where, for example, a portion of the battery cell 10 included in the battery module gets ignited, the battery module 1 in FIG. 1 can easily spread the flame to the adjacent battery cells 10. However, because the structure of the battery module 1000 or a battery pack comprising the same has a small number of battery cell assemblies 100 in FIG. 2 separately accommodated inside the battery module 1000, it is unlikely for ignition to be transferred to other battery modules 1000 even if ignition occurs in the battery cell 10 within the single battery module 1000.

From the above, the battery cell assembly 100 of the present disclosure is connected in the longitudinal direction and the battery cell thickness direction, and the battery cell assembly 100 composed of a specific number of battery cells 10 is accommodated in each module case. Therefore, the battery module 1000 of the present disclosure can be referred to as an expandable module since various types of battery pack can be manufactured depending on the stacking (design) method of the battery module 1000 including the battery cell assembly 100.

The battery cell assembly 100 of an exemplary embodiment illustrated in FIG. 2 and FIG. 3 has a so-called 2P4S connection structure in which two battery cells 10 are connected in the longitudinal direction and the longitudinal direction unit cells 110 are stacked in four rows, having a battery cell assembly 100 composed of a total of eight battery cells 10.

However, by varying the number of rows of the longitudinal direction unit cell having two connected in the longitudinal direction, a battery cell assembly with even number of rows such as 2-row layer (1P4S), 6-row layer (3P4S), 8-row layer (4P4S) can be made possible. In addition, a structure that connects three instead of two in the longitudinal direction (1P6S,2P6S,3P6S, . . . ), a structure that connects four (1P8S,2P8S,3P8S, . . . ), and more linking structures can be made possible. In short, an advantage of the present disclosure is that it can change the stacking structure of the longitudinal direction unit cell and the battery cell assembly into various and expandable ways based on the design requirements of the battery module and the battery pack described above.

For the convenience of illustration, FIG. 3 does not illustrate the venting plate 300 and only illustrates the electrical connection structure of the battery cell assembly 100.

In FIG. 3, in terms of the longitudinal direction unit cell 110 of four rows, the electrode leads 11,12 of the battery cells facing each other in the longitudinal direction of the upper two rows are not coupled to each other but instead are each coupled to the terminal busbar of different polarities. However, the electrode leads 11,11/12,12 of the battery cells adjacent in the thickness direction of the upper two rows of battery cells can be coupled to each other, and the coupled electrode lead can also be coupled together to the terminal busbar. On the other hand, in terms of the longitudinal direction unit cell 110 of lower 2 rows that are not coupled to the terminal busbar, the electrode leads 11,12 of the battery cells facing each other in the longitudinal direction are coupled to each other. Specifically, in the longitudinal direction unit cell 110 of lower 2 rows, after the electrode leads 11,11/12,12 of adjacent battery cells in the battery cell thickness direction are coupled to each other, they can then be coupled to the electrode leads 12,12/11,11 of the other battery cells in the lower 2 rows facing each other in the longitudinal direction.

Meanwhile, the leads 11,12 of the battery cells included in the longitudinal direction unit cell 110 of adjacent rows at the front and rear ends in the longitudinal direction are bent in the thickness direction of the battery cell and are welded to each other.

The present disclosure also includes a module case 200 in which the battery cell assembly 100 is accommodated.

That is, as illustrated in FIG. 2, the present disclosure includes a module case 200 that surrounds and accommodates the battery cell assembly 100. The module case 200 has a cuboid structure elongated in the longitudinal direction to accommodate the battery cell assembly specific to the present disclosure. In FIG. 2, the module case 200 is formed by combining a C-shaped wall 210 and an I-shaped wall 220, but is not limited thereto. For example, it is possible to combine two C-shaped walls disposed left and right or up and down, and it is also possible to separate the up/down/left/right cases and combine them by welding, hooking, or with a fastening member.

In addition, the module case 200 of the present disclosure has a front end plate 230 and a rear end plate 240. The front end plate 230 and the rear end plate 240 are each coupled to the C-shaped wall-I-shaped wall assembly to close the front and rear sides of the module.

The module case 200, in order to have one end of the sensing line, which will be described later, can be exposed to the outside, can have an opening portion 211 at a position corresponding to one end of the sensing line. The sensing line can be exposed to the exterior through the opening portion and can have its one end coupled to the sensing plate to be described below.

The battery module of the present disclosure also includes a sensing line 400 electrically connected to the electrode lead of the battery cell included in the battery cell assembly. The sensing line 400 may be a sensing metallic wire of the conducting wire or a sensing cable with a predetermined sheath on the sensing metallic wire. Preferably, the sensing line 400 should have flexibility, and more preferably, the sensing line 400 should be able to be bent and become a sensing cable capable of plastic deformation by maintaining its bent shape. Selecting a sensing line made with such material may allow the electrode lead portion within the battery module or the path of the sensing line connected to the busbar or a sensing member to be freely changed to conform to the space within the module and get drawn outside the module case.

The sensing line 400 of the present disclosure is for sensing the electrical characteristics of the battery module such as voltage, current, resistance, etc. Therefore, the sensing line 400 may be connected to the sensing apparatus outside the module such as a sensing cable, and ultimately be connected to BMS, ECU, or a controller installed in the battery pack to measure electrical characteristics between a plurality of battery modules or between unit battery modules. In order to measure electrical characteristics of the battery modules, the sensing line 400 needs to be electrically connected to the electrode lead of every battery cell 10 included in the battery cell assembly 100. However, the sensing line 400 does not need to be directly connected to each electrode lead, and it can be electrically connected to the electrode lead through a terminal busbar 500 coupled to the electrode lead.

A characteristic feature of the present disclosure is that one end of the sensing line 400 is exposed to the outside of the module case 200. That is, similar to the conventional battery module, a connector with male and female coupling structure is not installed for sensing, but instead redirect the sensing line 400 electrically connected to the battery cell inside the module towards the outer, and expose one end of the sensing line 400 to the outer of the module case 200. When the exposed one end of the sensing line 400 is coupled to the sensing plate 600 to be described later, the electrical properties of the battery module can be easily sensed. The specific formation of the sensing line 400 and its coupling relationship with other members will be described later.

The present disclosure includes a sensing plate 600 that is coupled to one end of the sensing line 400 exposed to the outside. The sensing plate 600 can sense the electrical characteristics of the battery module end by being coupled to one end of the sensing line 400. In addition, the sensing plate 600 can be connected to an adjacent battery module, or be connected to BMS or the like through a sensing cable. As such, because the sensing structure of the present disclosure is in the type of simple coupling between the sensing 400 and the sensing plate 600 rather than a connector structure, electrical coupling with an external terminal can be easily made. In addition, there is no need to a mold a complicated connector. As the sensing plate 600, a commonly used electrical connection member can be used, but it is necessary to have a plate portion 620 with a large area for connection with an external terminal.

FIG. 4 is a schematic diagram representing an exemplary embodiment of a sensing plate according to the present disclosure.

As illustrated above, the sensing plate 600 has a coupling portion 610 coupled to one end of the sensing line 400 and a plate portion 620 connected to the external terminal. While the bonding portion 610 may be coupled to one end of the sensing line by welding or screwing, the coupling method is not limited thereto, and it can employ different coupling methods as long as it can effectively couple the sensing line 400 to the sensing plate 600. The sensing plate 600 in (a) of FIG. 4 has a coupling portion 610 for welding, and the sensing plate in (b) of FIG. 4 has a coupling portion 610' provided with a fastening hole that allows coupling with a fastening member such as a screw. In order to be connected with the external terminal, the plate portion 620 has an area greater than that of the coupling portion 610,610'. Because the sensing plate 600 has a flat plate formation, it can be bonded to the outer surface of the module case 200 in close contact. For example, the sensing plate 600 can be more firmly coupled to the module case if the coupling portion 610 is coupled to one end of the exposed sensing line and the back surface of the plate portion 620 is coupled to the outer surface of the module case. A specific coupling formation between the sensing plate and the sensing line will be described below.

The battery module of the present disclosure also supports the battery cell assembly 100, the sensing line 400, and a terminal busbar 500 described below, and may have a venting plate 300 that ventilates gas inside the module.

Figure 5:
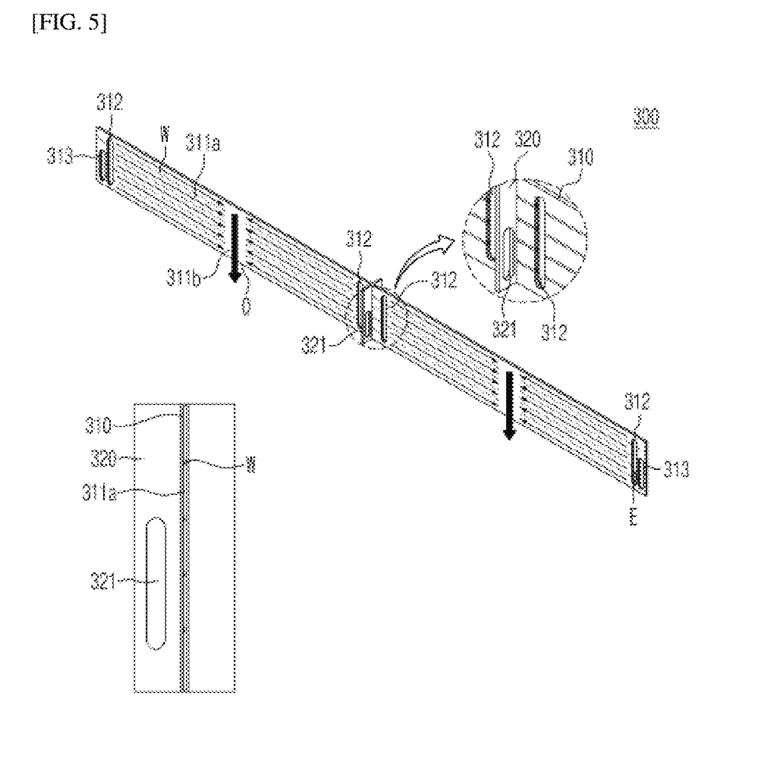
FIG. 5 is a perspective view and a front view the structure of a venting plate included in the battery module of FIG. 2.

FIG. 5 is a perspective view and a front view illustrating the structure of a venting plate included in the battery module of FIG. 2.

Referring to FIG. 2 and FIG. 5, the venting plate 300 is installed extending in the longitudinal direction of the battery cell across the front and rear ends of the module case 200 between the rows of the longitudinal direction unit cell 110 constituting the battery cell assembly 100. The venting plate 300 may prevent the spread of heat and flame in the battery cell thickness direction when flame is generated inside the battery cell due to overheating by being disposed between the rows of the longitudinal direction unit cells 110. Preferably, both sides of the venting plate 300 should each have the longitudinal direction unit cell 110 with the same number of rows disposed with respect to the longitudinal direction of the battery cell 10. In the present embodiment, two rows of the longitudinal direction unit cells 110 are disposed on the left and right sides with respect to the venting plate 300. The size of the venting plate 300 should be greater than the battery cell in order to cover the entire surface area of the battery cell. That is, the width of the venting plate 300 should be wide enough to cover the entire width of the battery cell. The length of the venting plate 300 can be extended in the battery cell longitudinal direction across the front end and rear end of the module case 200, long enough to cover the entire longitudinal direction unit cells 110.

Especially, the venting plate 300 has a hollow structure with a gas venting channel 311 provided inside that can discharge gas and flame.

The gas inside the battery module is mostly generated near the lead of the battery cell, and based on the pouch cell, near the gas pocket which is a terrace portion between the lead and the battery cell main portion. Therefore, it is desirable for the venting channel 311 to have a gas inlet E (venting through hole 312 or an opening communicating therewith) communicating with the inside of the battery module at the position of the venting plate 300 corresponding to the gas pocket portion. Referring to FIG. 5, the venting plate 300 has a total of four venting through hole 312 at positions corresponding to the gas pocket portion of the battery cell included in the battery cell assembly 100, and these venting through holes 312 may communicate with the gas venting channel 311.

In addition, the gas venting channel 311 may have an outlet O through which the gas and flame can be discharged. Because the gas and flame flowing through the gas inlet corresponding to the gas pocket portion is high in temperature, the outlet O of the venting channel needs to be located far away from the inlet to lower the gas temperature and discharge it to the outside. To this end, the gas venting channel 311 of the present disclosure has a flow channel extending from the gas inlet E to the outlet O.

Specifically, the gas venting channel 311 may include a longitudinal direction channel 311a extending in the longitudinal direction of the venting plate 300, and a width direction channel 311b communicating with the longitudinal direction channel 311a and opened to the outside of the venting plate 300. Here, it is desirable for the width direction channel 311*b* to be provided at a position corresponding to the middle point between the leads of battery cell both ends included in the longitudinal direction unit cell 110 when the battery cell assembly is coupled to the venting plate 300. As illustrated in FIG. 5, the gas moves from the gas pocket portion near the lead of the battery cell end to the corresponding middle point through the longitudinal direction channel 311*a*, and from that point, it can easily discharge gas and flame through the width direction channel 311*b*.

The gas venting channel, especially the longitudinal direction channel 311*a*, can be provided in plurality along the longitudinal direction of the venting plate 300. Referring to the front view in FIG. 5, five longitudinal direction channels 311*a* of the venting plate 300 are provided by being separated by partition walls W. The gas that passed through these a plurality of longitudinal direction channels 311*a* is joined in the width direction channel 311*b* and can be discharged to the outside towards at least any one of upper and lower parts of the venting plate 300 in the width direction.

Meanwhile, the venting plate 300 of the present embodiment, besides the main portion 310 that gets extended in the longitudinal direction of the battery cell, has a heat transfer protection plate 320 installed perpendicular to the main portion 310. The heat transfer protection plate 320 is installed in a position corresponding to a place between the electrode leads of the battery cells facing each other in the longitudinal direction of the longitudinal direction unit cell 110. Therefore, the heat transfer between the battery cells arranged in the longitudinal direction of the longitudinal direction unit cell 110 can be blocked by the heat transfer protection plate 320.

Among the battery cells of the battery cell assembly 100, the adjacent battery cells that are not coupled to the terminal busbar described later can be directly connected to electrode leads. The venting plate 300 is either coupled to such an electrode lead, or includes a separate through hole 321 supporting the electrode lead portion coupled to the electrode lead. In the present embodiment, the separate through hole 321 is provided on one side of the heat transfer protection plate 320. In addition, in order to provide a space for the electrode lead of the battery cell at the front or rear of the longitudinal direction unit cell 110 are bent and welded, a lead bonding through hole 313 is provided at the front and rear ends of the venting plate 300 for the electrode lead of the battery cell to pass through. The size of the lead bonding through hole 313 can be varied depending on the purpose (a size that facilitates coupling between the leads or a size that is enough to support the coupled leads, etc.).

As illustrated above, the sensing line 400 is electrically connected to the electrode lead of the battery cell assembly 100. In order to sense the electrical properties of the module end, instead of coupling the sensing line 400 to electrode lead of each battery cell, it is more efficient to couple the sensing line 400 to the terminal busbar 500 electrically connected to the electrode lead. Because the terminal busbar 500, in terms of the battery module, is a terminal that is connected to external terminals by being electrically connected to each battery cell, it can sense the electrical characteristics of all battery cells within the battery module, that is, at the module end, if the sensing line 400 is connected to the terminal busbar 500.

An exemplary embodiment of the present disclosure, by connecting the sensing line 400 to the terminal busbar 500 that is coupled to the electrode lead of the battery cell included in the battery cell assembly 100, is consequentially electrically connecting the sensing line 400 to the battery cell 10 through the terminal busbar 500. Prior to explaining the connecting structure between the sensing line 400 and the terminal busbar 500, in terms of the expandable battery module as in the present disclosure, the connecting structure of the terminal busbar 500 and the battery cell assembly 100 will be explained. Accordingly, the electrical connecting structure of the battery module represented by the terminal busbar 500 becomes clear, and it can be easily understood that sensing cam be easily performed at the module end of the battery module simply by connecting the sensing line 400 to the terminal busbar 500.

Figure 6:
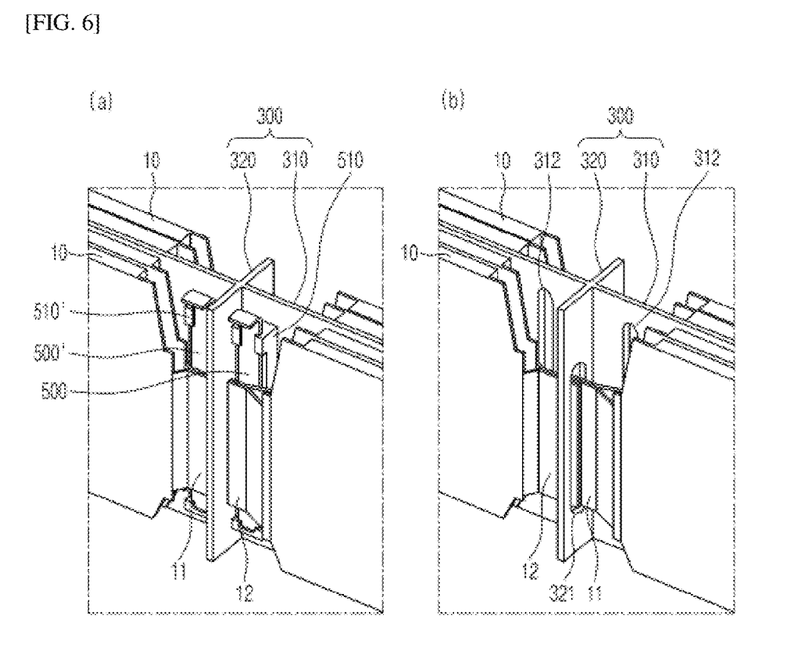
FIG. 6 is a perspective view illustrating a coupling structure of the middle portion of the battery module excluding a sensing line and a module case of the present disclosure.
Figure 7:
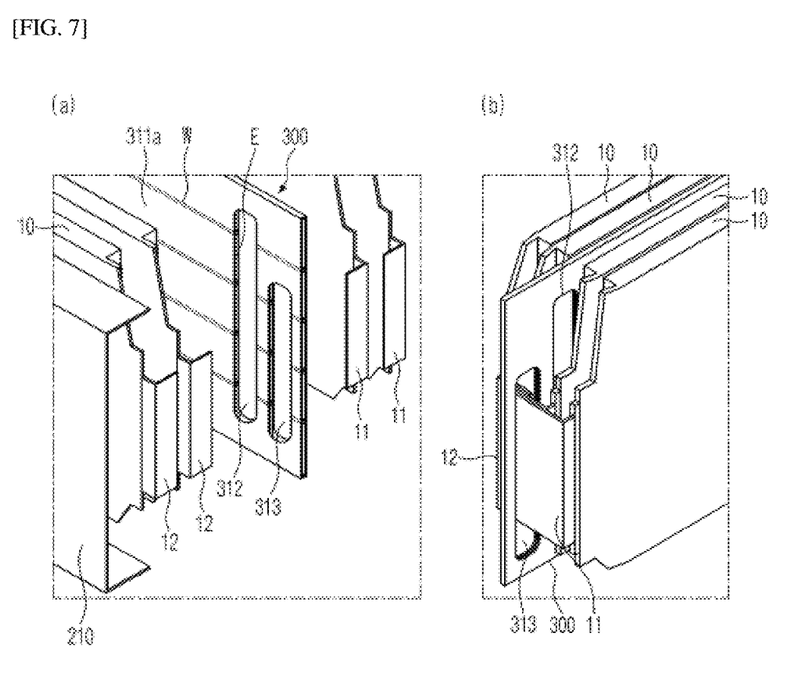
FIG. 7 is a perspective view illustrating the coupling structure of the end of the battery module according an embodiment of the present disclosure.

FIG. 6 is a perspective view illustrating a coupling structure of the middle part of the battery module excluding the sensing line and the module case of the present disclosure, and FIG. 7 is a perspective view illustrating a coupling structure of the end of the battery module according to the present disclosure.

(a) of FIG. 6 illustrates a coupling between the electrode leads of the battery cell facing in the longitudinal direction corresponding to the middle of the longitudinal direction unit cell 110. On one side (front side) of the venting plate 300, terminal busbars 500,500' are coupled to the main portion 310 located on the left and right sides of the heat transfer protection plate 320, and the leads of battery cells in the front two rows are respectively coupled to the terminal busbars 500,500'. Terminal busbar supporting blocks 510, 510' are installed on the venting plate to facilitate coupling between the terminal busbars 500,500' to the venting plate, and the terminal busbars may be inserted and coupled to the supporting blocks 510,510' (refer to (a) of FIG. 6). However, with respect to the battery cells of front two rows, the electrode leads 11,12 of the battery cells facing each other in the longitudinal direction cannot be coupled to each other.

(b) of FIG. 6 shows the other side (rear side) of the venting plate 300, and it illustrates the electrode leads 11,12 of both sides of the battery cell facing in the longitudinal direction being welded through the through hole 321 for lead coupling provided on the heat transfer protection plate 320 of the venting plate 300. However, the bond between the electrode leads 11,12 is not limited to the coupling through direct welding, and it is also possible to be coupled, for example, by interposing an inter-busbar (not illustrated) between the electrode leads.

FIG. 7 illustrates a bonding relationship between the electrode leads of the battery cell located on the ends of the longitudinal direction unit cell 110; (a) of FIG. 7 and (b) of FIG. 7 each represents a state before coupling and a state after coupling, respectively.

In (a) of FIG. 7, the electrode leads 12,12 of the two-row longitudinal direction unit cell 110 on one side (front side) of the venting plate 300 are bent to the venting plate 300 side in the battery cell thickness direction, and the electrode leads 11,11 of the two-row longitudinal direction unit cell 110 of the other side (rear side) are also bent to the venting plate 300 side.

It is shown in (b) of FIG. 7 that the bent electrode-leads 11,12 of the battery cell are welded through the lead coupling through hole 313 provided on the venting plate 300. However, even in this case, the coupling between the electrode leads 11,12 is not limited to the coupling through direct welding, and it is also possible to be coupled, for example, by interposing an inter-busbar between the electrode leads.

As illustrated in FIG. 3, FIG. 6, and FIG. 7, the battery cell assembly 100 of the present disclosure is electrically connected in a 2P4S structure, and the terminal busbar 500 is each coupled to the leads by being located between the leads of the battery cell 10 facing each other in the longitudinal direction. More specifically, the terminal busbar 500 is composed of a first terminal busbar 500 that is coupled to electrode lead on one side or electrode leads among the electrode leads of battery cells facing each other in the longitudinal direction, and a second terminal busbar 500' that is coupled to an electrode lead on the other side or electrode leads. The first and second terminal busbars 500, 500' are connected to electrode leads of different polarities, respectively. As described below, the sensing line is composed of a first sensing line 400 coupled to the first terminal busbar 500 and a second sensing line 400' coupled to the second terminal busbar 500', and can sense the electrical characteristics of the module end. In addition, the sensing plate has a first and a second sensing plate 600,600' that are each coupled to the first and the second sensing lines, respectively.

Hereinafter, an embodiment of a coupling structure of a specific sensing line and a sensing plate will be explained in the case where the terminal busbar is disposed between the battery cells facing each other in the longitudinal direction of the longitudinal direction unit cell.

First Embodiment

Figure 8:
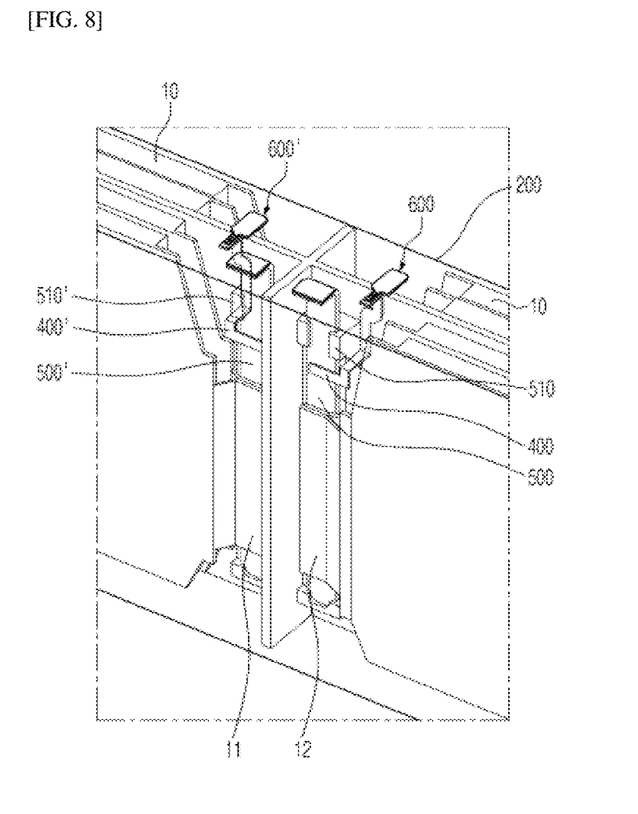
FIG. 8 is a perspective view illustrating the coupling structure of the middle portion of the battery module according to an embodiment of the present disclosure.

FIG. 8 is a perspective view illustrating a coupling structure of the middle part of the battery module according to an exemplary embodiment of the present disclosure.

The terminal busbars 500,500' are located between leads on both sides of the battery cell facing each other in the longitudinal direction, and has a first and a second terminal busbar 500,500' that are each coupled to the leads on both sides. In addition, a module case 200 with a cuboid structure surrounding the battery cell assembly and the terminal busbar is illustrated in FIG. 8. In FIG. 8, it is shown that the sensing lines 400,400' are coupled to the terminal busbars 500,500' inside the module case 200 and the sensing plates 600,600' located outside of the module case, respectively. That is, the other ends of the sensing lines 400,400' are horizontally bent towards the sensing plates 600,600' and welded to the sensing plates. The sensing lines 400,400' also have the first and the second sensing lines 400,400' corresponding to the terminal busbars 500,500', and one end of the first and the second sensing line is bent towards the module case 200. One end of the sensing line 400,400' is exposed to the outside of the module case through the opening portion provided in the module case, and the coupling portion of the sensing plates 600,600' may be coupled to this exposing portion by welding, a fastening member, etc.

Second Embodiment

Figure 9:
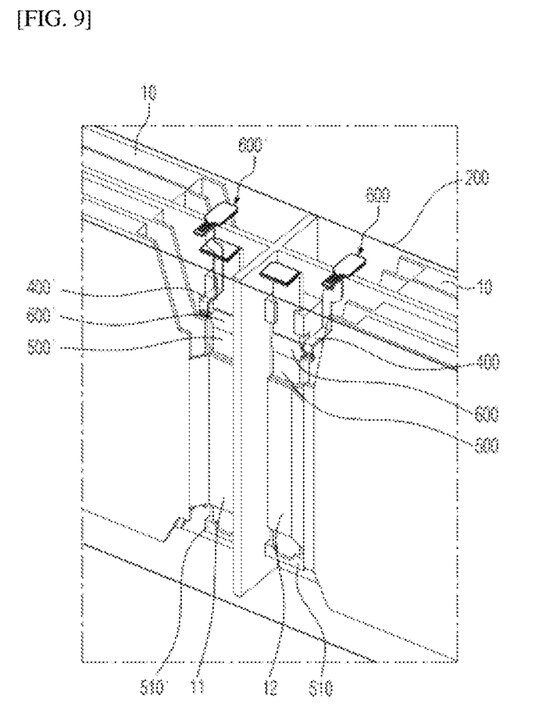
FIG. 9 is a perspective view illustrating the coupling structure of the middle portion of the battery module according to another embodiment of the present disclosure.

FIG. 9 is a perspective view illustrating a coupling structure of the middle part of the battery module according to another exemplary embodiment of the present disclosure.

The basic coupling structure of the sensing line and the sensing plate of the present embodiment is the same as that of the first embodiment. However, one difference is that the other end of the sensing line is not directly coupled to the terminal busbar, but is connected to the terminal busbar through the same sensing plate installed outside the module case.

In the first embodiment, the sensing line was horizontally bent toward the terminal busbar 500,500' from the portion where the sensing lines 400,400' are being vertically extended in order to be coupled to the terminal busbars 500,500'. In this case, because the sensing lines 400,400' are sharply bent, the bending portion could be damaged due to the bending load if used for a long period of time. In addition, because the position of the terminal busbars 500, 500' can vary depending on the type, form, and internal structure of the battery module, it is inefficient to mold by changing the shape (path) of the sensing line corresponding to the location of the terminal busbars 500,500'. For example, the problem gets bigger if the sensing lines 400, 400' are molded into a conductive metal plate. In the present embodiment, by placing the sensing plates 600,600' between the other end of the sensing lines 400,400' and the terminal busbar, even if the location of the terminal busbars 500,500' and the path of the sensing lines 400,400' are different, it can easily connect the sensing line to the terminal busbar by using the sensing plates 600,600' as a kind of a bridge. Therefore, there is no need to forcedly bend or mold the sensing lines 400,400'. That is, by appropriately installing the sensing plate by considering the shape and the location of the sensing line as well as the location of the terminal busbar, there may be an advantage of electrically connecting the sensing lines 400,400' to the terminal busbars 500,500' corresponding to various types of module internal structures.

Figure 10:
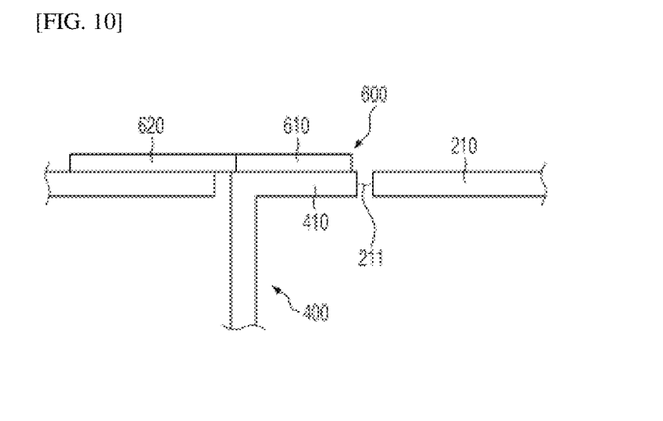
FIG. 10 is a schematic diagram showing the cross section of the coupling between a sensing line and a sensing plate.

Meanwhile, one end of the sensing lines 400,400' may be exposed by being protruded to the outside. However, it is desirable that the sensing lines 400,400' are not completely protruded to the outside of the module case 200 in order to reduce the space occupied by the sensing unit and to configure the battery module more compactly by bringing the sensing plate into close contact with the module case. If the exposed surface of the sensing lines 400,400' is positioned at the same height as the side of the module case 210, the portion where one end of the sensing line 410 is protruded to the outside will be gone, and the sensing plates 600,600' can be coupled to the exposed surface. FIG. 10 shows a schematic diagram of the cross section of a bond between a sensing line and a sensing plate. As illustrated, while one end 410 of the sensing line 400 is exposed through the opening portion of the module case 400, the sensing line 400 does not get protrude outside of the case because the exposed surface of one end 410 is at the same height as the side of the module case 210. Therefore, the sensing plate 600 arranged in parallel to the side of the module case can have its coupling portion 410 tightly coupled to the exposed surface of one end of the sensing line. Accordingly, the plate portion 620 of the sensing plate 600 is also closely contacted to the side of the module case 210. Therefore, the entire sensing plate 600 may be closely coupled to the module case to compose a more compact battery module.

In the meantime, one end 410 of the sensing line 400 is horizontally bent to form a portion that is parallel to the sensing plate 600. That is, the horizontally bent portion forms a coupling plate facing the sensing plate 600 so that it is coupled to the coupling portion 610 of the sensing plate 600 with a sufficient contact area.

Figure 11:
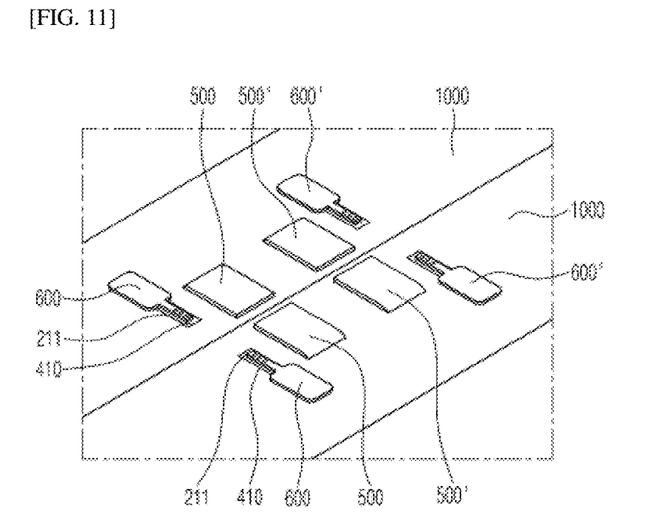
FIG. 11 is a drawing showing the upper surface of the battery module layer in which the battery modules of the present disclosure are stacked and coupled.

FIG. 11 shows a drawing of the upper surface of a battery module layer in which battery modules of the present disclosure are stacked and coupled.

The present drawing shows the case where two battery modules are stacked in the thickness direction of the battery cell.

The terminal busbars 500,500' of each battery module 1000 are protruded to the outside in order to be connected to the external terminal. In addition, on both sides of the terminal busbars 500,500', the sensing plates 600,600' are located on the module case. The coupling portion of the sensing plates 600,600' is coupled to one end 410 of the sensing lines 400,400' exposed to the outside through the opening portion 211 provided on the upper side surface of the module case. The electrical characteristics at the module end can be easily sensed when a sensing cable, etc. is connected to the plate portion 620 of the sensing plates 600,600'.

As such, according to the present disclosure, sensing at the module end and connecting the sensing portion between the neighboring battery modules can be easily performed without the need to prepare complicated connector structure, inter-busbar, harness, etc. That is, a battery module with a sensing portion for sensing can be formed more compactly to conform to the structure of the module with expandability. In addition, because a plurality battery modules can be directly connected to the sensing cable by having sensing line and sensing plate exposed to the outside, a direct sensing structure can be implemented in a simple form.

While FIG. 11 illustrates two battery modules being stacked, two or more battery modules 1000 can be stacked in the thickness direction of the battery cell. In addition, a battery pack can be composed by accommodating these battery modules in a pack case.

Battery pack with a direct sensing structure can be implemented by connecting the sensing plate of the battery module to the BMS or the like of the battery pack.

The exemplary embodiments disclosed in the present disclosure are considered in a descriptive sense only and not for purposes of limitation, and the scope of the invention is not limited by the embodiments. It should be interpreted that the scope of the invention is defined by the appended claims, and encompasses all modifications and equivalents that fall within the scope of the appended claims.

Meanwhile, in the present specification, although the terms such as, upward, downward, left, right, forward, and rearward, which indicate directions, have been used, the terms are only for the sake of convenience in the description, and it is clear that the directions change according to a position of a target object or an observer.

The invention claimed is:

1. A battery module, comprising:
a battery cell assembly including two or more longitudinal unit cells stacked in a thickness direction of a battery cell, wherein each of the two or more longitudinal unit cells comprises two or more battery cells having electrode leads provided at both ends thereof in a longitudinal direction and arranged in a row in the longitudinal direction;
a module case accommodating the battery cell assembly;
a sensing line electrically connected to the electrode leads of the two or more battery cells included in the battery cell assembly and sensing electrical properties of the battery cells, wherein the sensing line is accommodated in the module case and is having a first end exposed to an outside of the module case; and
a sensing plate coupled to the first end of the sensing line and sensing electrical properties of the battery module,
wherein the sensing line is connected to a terminal busbar coupled to at least one of the electrode leads of the battery cells included in the battery cell assembly, and the sensing line is electrically connected to the battery cells of the battery cell assembly through the terminal busbar,
wherein the terminal busbar is positioned between the electrode leads of the battery cells facing in the longitudinal direction of the longitudinal direction unit cell, and the electrode leads of the battery cells facing in the longitudinal direction are coupled to the terminal busbar,
wherein the terminal busbar comprises a first terminal busbar coupled to one electrode lead or electrode leads among the electrode leads of the battery cells facing each other in the longitudinal direction and a second terminal busbar that is coupled to the other electrode lead or electrode leads,
wherein the sensing line comprises a first sensing line coupled to the first terminal busbar and a second sensing line coupled to the second terminal busbar, and
wherein the sensing plate comprises a first sensing plate coupled to the first sensing line and the second sensing plate coupled to the second sensing line.

2. The battery module of claim 1, wherein the sensing plate has a coupling portion coupled to the first end of the sensing line, and a plate portion connected to an external terminal.

3. The battery module of claim 2, wherein the plate portion has an area greater than an area of the coupling portion.

4. The battery module of claim 1, wherein:
the sensing plate is disposed parallel to a side surface of the module case, in which the first end of the sensing line is exposed,
an exposed surface of the first end of the sensing line is positioned at the same height as the side surface of the module case, and
the sensing plate contacts the side surface of the module case while the sensing plate is coupled to the exposed surface of the first end of the sensing line.

5. The battery module of claim 1, wherein the module case has an opening portion in a position corresponding to the first end of the sensing line, and the sensing line is externally exposed through the opening portion.

6. The battery module of claim 1, wherein the first end of the sensing line is bent to form a coupling plate parallel to the sensing plate.

7. The battery module of claim 1, wherein a second end of the sensing line opposite to the first end is welded to the terminal busbar.

8. The battery module of claim 1, wherein a second end of the sensing line opposite to the first end and the terminal busbar are coupled by the same type sensing plate as the sensing plate coupled to first end of the sensing line.

9. The battery module of claim 7, wherein: A battery module, comprising:
a battery cell assembly including two or more longitudinal unit cells stacked in a thickness direction of a battery cell, wherein each of the two or more longitudinal unit cells comprises two or more battery cells having electrode leads provided at both ends thereof in a longitudinal direction and arranged in a row in the longitudinal direction;
a module case accommodating the battery cell assembly;
a sensing line electrically connected to the electrode leads of the two or more battery cells included in the battery cell assembly. and having a first end exposed to an outside of the module case; and
a sensing plate coupled to the first end of the sensing line,
wherein the sensing line is connected to a terminal busbar coupled to at least one of the electrode leads of the battery cells included in the battery cell assembly, and the sensing line is electrically connected to the battery cells of the battery cell assembly through the terminal busbar, wherein a venting plate, extending in the longitudinal direction of the battery cell and having a venting channel therein, is installed between rows of the same number of longitudinal direction unit cells on both sides based on the longitudinal direction of the battery cell, and wherein the terminal busbar and the sensing line are supported by the venting plate.

10. The battery pack, comprising:
a plurality of the battery modules of claim 1.

11. The battery pack of claim 10, wherein the plurality of the battery modules are stacked in the thickness direction of the battery cell.

\* \* \* \* \*